(12) United States Patent
Shawabkeh et al.

(10) Patent No.: US 8,596,047 B2
(45) Date of Patent: Dec. 3, 2013

(54) VEHICLE ELECTROCATALYZER FOR RECYCLING CARBON DIOXIDE TO FUEL HYDROCARBONS

(75) Inventors: Reyad Awwad Khalaf Shawabkeh, Dhahran (SA); Abdalla Mahmoud Abulkibash, Dhahran (SA); Muhammad A. Al-Saleh, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 343 days.

(21) Appl. No.: 13/190,399

(22) Filed: Jul. 25, 2011

(65) Prior Publication Data

US 2012/0137664 A1 Jun. 7, 2012

(51) Int. Cl.
*F01N 3/10* (2006.01)
(52) U.S. Cl.
USPC .......... 60/299; 60/274; 60/278; 60/282; 205/462; 205/555; 429/416
(58) Field of Classification Search
USPC .................................................. 60/274–324
See application file for complete search history.

(56) References Cited

U.S. PATENT DOCUMENTS

| 5,616,430 | A  | * | 4/1997 | Aoyama | 429/414 |
| 6,267,864 | B1 | * | 7/2001 | Yadav et al. | 205/341 |
| 2002/0025457 | A1 | | 2/2002 | Dodd et al. | |
| 2003/0121481 | A1 | | 7/2003 | Dodd et al. | |
| 2009/0101516 | A1 | * | 4/2009 | Suib et al. | 205/338 |
| 2009/0277799 | A1 | * | 11/2009 | Grimes et al. | 205/350 |
| 2011/0091778 | A1 | * | 4/2011 | Kambara et al. | 429/408 |

FOREIGN PATENT DOCUMENTS

| EP | 0539244 A1 | 4/1993 |
| GB | 2448685 A | 10/2008 |
| GB | 2461723 A | 1/2010 |

\* cited by examiner

*Primary Examiner* — Thomas Denion
*Assistant Examiner* — Jesse Bogue
(74) *Attorney, Agent, or Firm* — Richard C. Litman

(57) ABSTRACT

The vehicle electrocatalyzer for recycling carbon dioxide to fuel hydrocarbons includes a main tubular member having a plurality of tubular catalytic cells, electrically connected in series disposed inside and separated from one another by semipermeable membranes allowing the passage of fluids, but not solids. The electrocatalyzer can be attached in the exhaust system where hydrogen could be generated by the electrolysis of water. Metallic copper, iron, carbonaceous materials (such as activated carbon, carbon nanomaterials, or graphite), metal oxides, or metal-supported catalysts may be used in each catalytic cell. A DC current connected across the cells is used to initiate reaction of the carbon dioxide with hydrogen gas. The resulting hydrocarbons are recycled back to the vehicle engine and used as a makeup fuel.

13 Claims, 3 Drawing Sheets

VEHICLE ELECTROCATALYZER FOR RECYCLING CARBON DIOXIDE TO FUEL HYDROCARBONS

BACKGROUND OF THE INVENTION

1. Field of the Invention

The present invention relates to devices for controlling motor vehicle emissions, and particularly to a vehicle electrocatalyzer for recycling carbon dioxide to fuel hydrocarbons.

2. Description of the Related Art

Catalytic converters are devices used to reduce the toxicity of exhaust emissions from an internal combustion engine. Inside a catalytic converter, a catalyst stimulates a chemical reaction in which noxious byproducts of combustion (such as carbon monoxide, unburned hydrocarbons, and oxides of nitrogen) are converted to less-toxic or inert substances, such as carbon dioxide, hydrogen, nitrogen and oxygen. These devices, however, fail to deal with carbon dioxide ($CO_2$), a known greenhouse gas. Moreover, with the ever rising gas prices there is a push to increase fuel economy. Thus, at least the two aforementioned concerns have not adequately been dealt with until now.

Thus, a vehicle electrocatalyzer for recycling carbon dioxide to fuel hydrocarbons solving the aforementioned problems is desired.

SUMMARY OF THE INVENTION

The vehicle electrocatalyzer for recycling carbon dioxide to fuel hydrocarbons includes a tubular member having a plurality of catalytic cells electrically connected in series and separated from one another by semipermeable membranes that allow the passage of fluids, but not solids. The electrocatalyzer can be attached in the vehicle's exhaust system, where hydrogen could be generated by the electrolysis of water. Metallic copper, iron, carbonaceous materials (such as activated carbon, carbon nano-materials, or graphite), metal oxides, or metal-supported catalysts may be used in each catalytic cell. A DC current connected across the cells is used to initiate reaction of the $CO_2$ with hydrogen gas. The resulting hydrocarbons are recycled back to the vehicle engine and used as a makeup fuel. The electrocatalyzer will decrease the total fuel consumption in the vehicle and will be an environmentally friendly device acting to decrease the greenhouse effect, which is drastically affecting the global warming.

These and other features of the present invention will become readily apparent upon further review of the following specification and drawings.

Brief Description of the Drawings

Similar reference characters denote corresponding features consistently throughout the attached drawings.

DETAILED DESCRIPTION OF THE PREFERRED EMBODIMENTS

Figure 1:
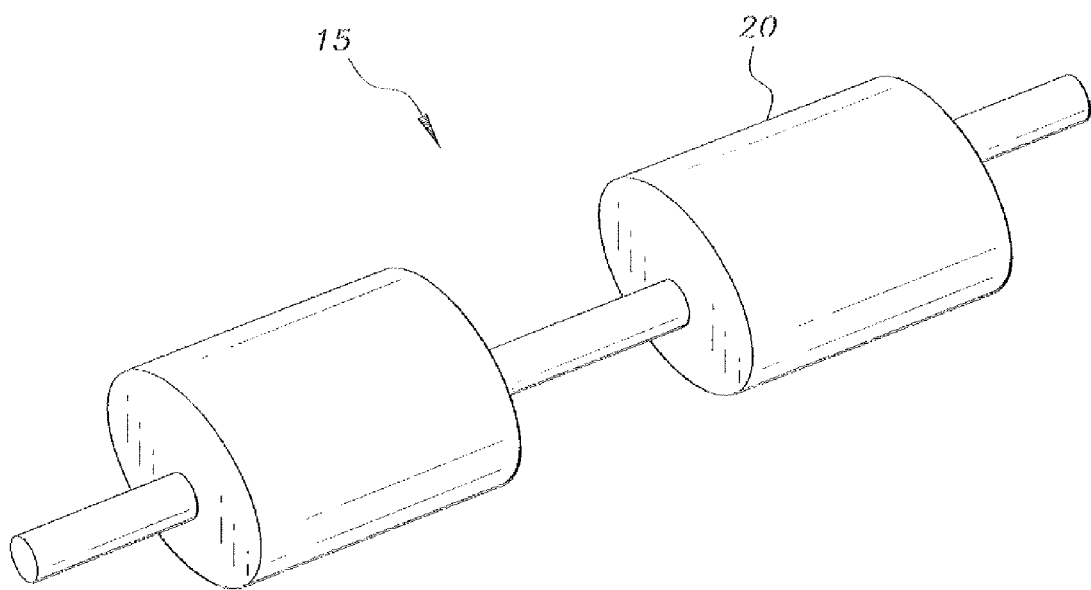
FIG. 1 is an environmental, perspective view of a vehicle electrocatalyzer for recycling carbon dioxide to fuel hydrocarbons according to the present invention.
Figure 2:
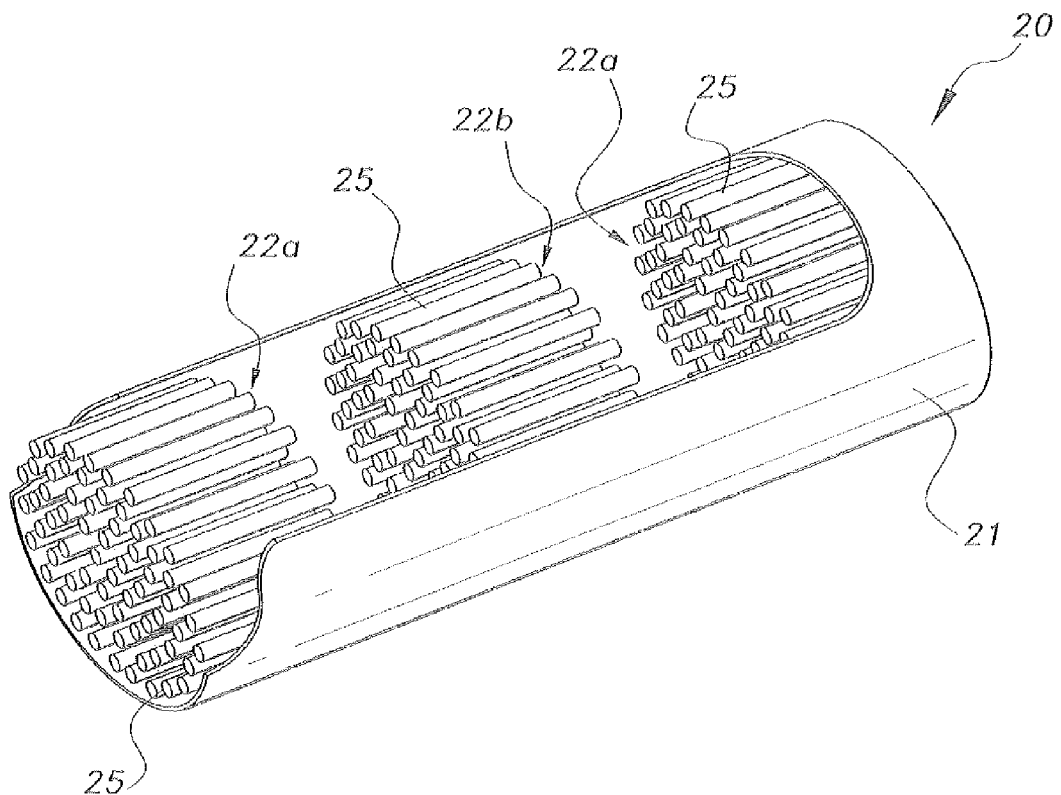
FIG. 2 is a partial perspective view of a vehicle electrocatalyzer for recycling carbon dioxide to fuel hydrocarbons according to the present invention.
Figure 3:
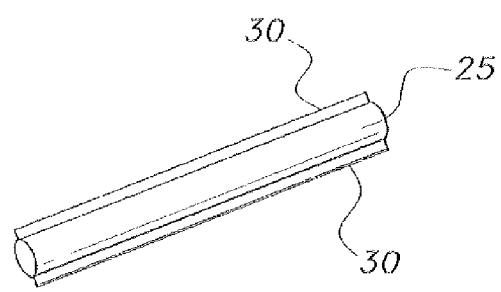
FIG. 3 is a perspective view of an inner tube and nanocatalyst for a vehicle electrocatalyzer for recycling carbon dioxide to fuel hydrocarbons according to the present invention.

As shown in FIGS. 1-3, an exemplary vehicle electrocatalyzer 20 has a hollow outer shell 21 that houses a plurality of multistage, electrically conducting inner tubular electrocatalytic cell modules 22a (positive) and 22b (negative) connected in series and spaced at intervals in an alternating manner inside and along an axial center of the outer shell 21. The tubular modules 22a and 22b function as electrodes and are suspended in the outer shell 21 by a fluid disposed inside the outer shell 21. Each module 22a, 22b has a length of approximately 5-10 cm, and is then followed by an isolator from the other modules that are connected to the previous ones in series. Each inner tube 25 of the inner tubular modules 22a, 22b is coated with thin, elongate fin-like members 30 composed of nanoparticles. These cells will accommodate the catalyst like metallic copper, iron, carbonaceous material (such as activated carbon, carbon nanomaterial, or graphite), metal oxides, or metal-supported catalysts. The electrocatalyzer unit is composed of multiple electrocatalytic cells connected in series. An electric potential should be applied across each cell. This potential could be generated across the whole catalyzer by connecting the first cell to the cathode and the last cell to the anode. This potential is changeable for any cell in the series, and could have any value starting from a few millivolts to kilovolts. Changing the potential across the whole cells will help in controlling the selectivity and the yield of the hydrocarbons produced by electrocatalysis.

Fluid and gas manifolds may be attached to the device 20 at opposing ends. The gas manifold handles gaseous flow of vehicle exhaust through the device 20. The fluid manifold handles inner tubular module suspension fluid through the device 20. Fluids, such as water vapor, alcohols, organics, solutions, or any conducting fluid, are allowed to circulate across the catalyzer cells 22a, 22b.

Gas/fluid semipermeable membranes 40 are disposed between the alternating tubular modules 22a and 22b. This mechanism will enhance both "absorption and adsorption" of $CO_2$ and $H_2$, which will, in turn, enhance the rate of conversion. Accordingly, the yield of the produced hydrocarbons will he increased. The membrane 40 allows only the passage of gases and/or fluids, and Forbids any solid or semi-solid catalysts to pass from one cell to another.

FIG. 1 shows the device 20 arranged as a fuel recovery component in a vehicle's exhaust system 15. When a positive electrical charge is applied to modules 22a and negative electrical charge is applied to modules 22b, the device 20 converts any $CO_2$ flowing through the device 20 to fuel hydrocarbons. The electrical potential needed could be generated across each cell 22a, 22b in the device 20, or across the device 20 as a whole. This potential could be linear or differential across these cells 22a, 22b.

Other configurations of the electrocatalyzer 20 can be made by packing electrical (conductive and/or semi conductive) catalyst inside the main tube, followed by an isolator, then followed by another packing, and so on. Each set of electrodes can be connected in either parallel or series of potential. For example, if the electrocatalyzer is composed of ten electrodes (five cathodes and five anodes), the design of the tube will be cathode-anode-cathode-anode-cathode, etc. The potential between the cathodes and anodes can be constant or varied. This means that if the potential between the first cathode-anode is, for example, 10 volts, then the potential for the second set of cathode-anode is either 10 volts (if constant), or, for example, 8 volts (if varied), and the like.

Figure 4:
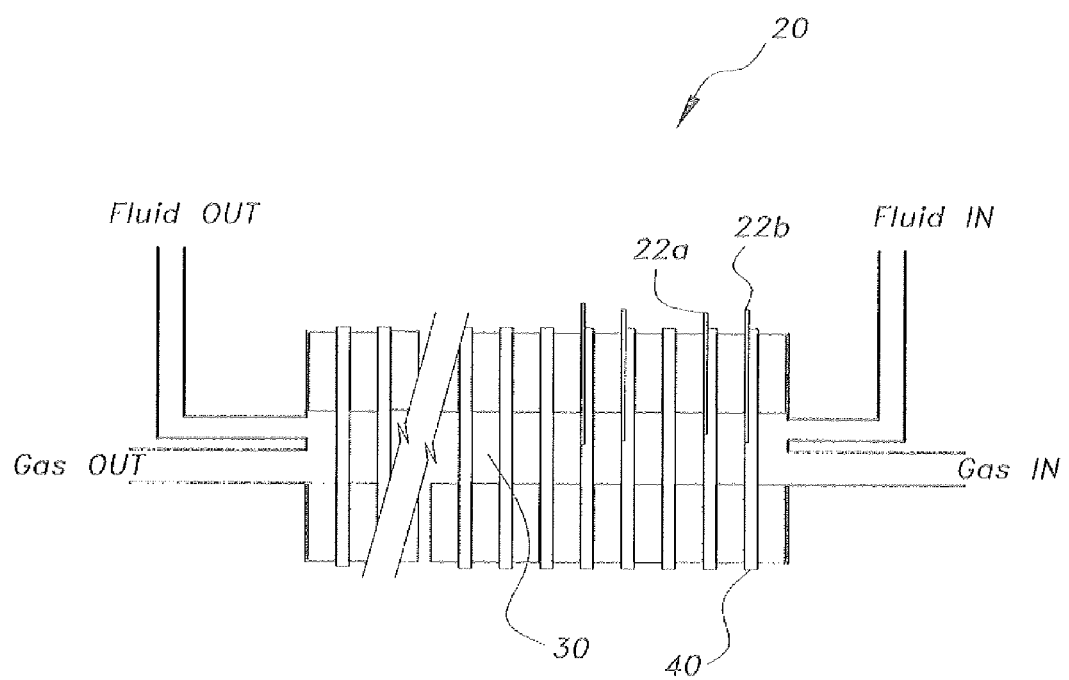
FIG. 4 is a diagram showing an arrangement of electrocatalytic cells in a vehicle electrocatalyzer for recycling carbon dioxide to fuel hydrocarbons according to the present invention.

During operation of the device 20, hydrogen could be generated by the electrolysis of water. Metallic copper, iron, carbonaceous materials (such as activated carbon, carbon nanomaterials, or graphite), metal oxides, or metal-supported catalysts may be used in each catalytic cell module 22a or 22b. A DC current connected across the cell modules 22a, 22b is used to initiate reaction of the $CO_2$ with hydrogen gas flowing through the device 20. The resulting hydrocarbons are recycled back to the vehicle engine via a portion of the Gas IN and Gas OUT manifold shown in FIG. 4. This recycled hydrocarbon mix is used as a makeup fuel to boost combustion power of a combustion engine upstream from the device 20. The $CO_2$ recycling vehicle electrocatalyzer 20, thus, will decrease the total fuel consumption in a vehicle and will be an environmentally friendly device, acting to decrease the greenhouse effect, which is drastically affecting the global warming.

The potential across the electrocatalyzer is based on either direct current or alternating current. The potential could be as low as millivolts, and as high as on the order of magnitude of a thousand volts. The value of the potential depends on the type of the fluid that passes through the electrodes. If only the vehicle exhaust gases are passed without any carrier fluid to promote the sorption capacity of $CO_2$ onto the catalyst surface, such as, but not limited to, a methanol-water-salts system, then the potential can be high. Moreover, the device 20 works at elevated temperature. Therefore, there is no need to cool down the exhaust gases from the vehicle or power plant.

One of the main products from a direct reaction of carbon dioxide with hydrogen using this system 20 is, but is not limited to, ethylene. Thus, there is no need to convert the $CO_2$ to CO by a reverse water shift reaction. Therefore, the system 20 does not target only methanol or methane. Moreover, the electrocatalyzer 20 can be used to recycle $CO_2$ from vehicles and/or power plants.

The electrocatalyzer 20 converts carbon dioxide to a selected hydrocarbon, such as ethylene, by combining the effects of absorption and adsorption, where $CO_2$ is absorbed by electrolytic solution, then gets adsorbed on the surface of a nanocatalyst 30 for higher yield and conversion.

The nanocatalyst 30 provides enhanced selectivity of the target hydrocarbon for conversion of $CO_2$ to hydrocarbons. For different nanocatalysts 30, each catalyst will yield a selective product, such as C1-C6 hydrocarbons, alcohols, ethers, or carboxylic acids.

The nanocatalyst 30 proves to be more efficient that regular catalysts. The nanocatalyst 30 uses a direct and/or alternating current with variable frequency to generate hydrocarbons with low energy consumption. Moreover, the catalyst 30 is a fixed-bed nanocatalyst that provides a constant surface of contact for the reactants and has reliable light products, such as $C_1$-$C_6$ hydrocarbons, ethylene, and the like.

The electrocatalyzer 20 functions in working fluid, i.e., water- or organic-based electrolyte or gaseous-based fluid. In the later case, exhaust gases from the vehicle can be directly passed through the electrocatalyzer to produce hydrocarbons.

The electrocatalyzer 20 could be mounted in any position in a way to maintain acceptable levels of the fluids during circulation. This arrangement is suggested to prevent losses of reactants in order to obtain the maximum yield and the optimum selectivity. A two-phase separator may be connected to the catalyzer to separate organic from inorganic materials, and a drainage system may be used to remove the excess water that is generated from combustion. The catalyzer could be surrounded by a jacket of a cooling or heating fluid to maintain any isothermal conditions required, controlling the electrochemical reaction temperature across the cells. The temperature will be adjusted by a computerized system.

The inner tubes 25 coated with nano particle members 30 use nano-copper supported onto carbon nano-tubes, nano-copper particles, nano-tin catalyst, and/or combination of any transition metal or metal oxides supported/impregnated onto the surface of a support, such as silica, alumina, clay, or carbon-based material. Unique to the electrocatalyzer is the idea of designing a device that should be mounted at a vehicle's exhaust for the conversion of carbon dioxide to hydrocarbons. The device 20 could have any shape, such as, but not limited to, cylindrical or rectangular, to obtain higher yields and the desired selectivity for each product.

Each cell 22a, 22b could be filled with any kind of the required catalysts, such as metallic elements, oxides, semiconductors, aluminosilicates, metal-doped/impregnated catalysts, or nanomaterials, such as carbon nanotubes or nanocopper particles. Moreover, the device 20 will act to enhance both the absorption and the adsorption of the reactants by the solid catalysts used. The device 20 could be cooled or heated by either a jacket or a coil to promote the reaction between hydrogen and carbon dioxide. Hydrogen can be supplied directly from a cylinder, or by using metal hydride cells, or through the electrolysis of water.

Such conditions as the amount of the current employed, the potential provided, the type and quantity of the catalyst used, the type and quantity of the carrier fluid, and the flow rates of the reactants can be optimized to give the maximum yield and the optimum selectivity for each of the desired products. The hydrocarbon product will be recycled back to the vehicle engine. The desired hydrocarbon product is separated from unwanted products by means of a suitable membrane, adsorption, or any separation technique.

The electrocatalyzer 20 utilizes nanocatalysts in a wet or dry base reaction. Moreover, the shape and design of the electrocatalyzer is new, and can be directly mounted onto the vehicle's exhaust system. The electrocatalyzer 20 produces other products, such as ethylene and alkanes.

It is to be understood that the present invention is not limited to the embodiments described above, but encompasses any and all embodiments within the scope of the following claims.

We claim:

1. A vehicle electrocatalyzer for recycling carbon dioxide to fuel hydrocarbons, comprising:
a hollow outer shell adapted for mounting in an exhaust system of a vehicle;
a plurality of multistage anodic and cathodic electrocatalytic cell modules electrically connected together and spaced at intervals, wherein adjacent cell modules have opposite polarities inside the hollow outer shell, each of the cell modules including a plurality of members having a nanoparticle coating, the nanoparticle coating being selected from the group consisting of metallic copper, iron, carbonaceous materials, metal oxides, and metal-supported catalysts;
gas manifolds having a gas-out conduit and a gas-in conduit attached to respective opposing ends of the hollow outer shell to allow carbon dioxide gas flow through the electrocatalyzer;
fluid manifolds having a fluid-out conduit and a fluid-in conduit attached to respective opposing ends of the hollow outer shell to allow electrolytic fluid flow through the electrocatalyzer; and
gas-fluid permeable isolation membranes disposed between the electrocatalytic cell modules; and wherein, when the gas manifold is connected in a feedback loop to a vehicle exhaust system and the fluid manifold is connected to cycle electrolyte through the electrocatalyzer and the cells are subjected to voltage across the cells while maintaining the opposing polarities of adjacent cell modules, carbon dioxide flowing through the electrocatalyzer is converted to selected hydrocarbon fuels based on the nanoparticle coating of each of the electrocatalytic cell modules, the hydrocarbon fuel being adapted for recycling to fuel a combustion engine of the vehicle.

2. The vehicle electrocatalyzer according to claim 1, further comprising a DC voltages source applying a direct current to the cell modules.

3. The vehicle electrocatalyzer according to claim 1, further comprising an AC voltage source applying an alternating current to the cell modules.

4. The vehicle electrocatalyzer according to claim 1, further comprising means for generating hydrogen by electrolysis of water.

5. The vehicle electrocatalyzer according to claim 1, wherein each of said anodic and cathodic electrocatalytic cell modules includes an electrically semi-conductive catalyst packing inside said outer housing, the electrocatalyzer further comprising an isolator disposed between adjacent packings.

6. The vehicle electrocatalyzer according to claim 1, wherein each of said anodic and cathodic electrocatalytic cell modules includes an electrically conductive catalyst packing inside said outer housing, the electrocatalyzer further comprising an isolator disposed between adjacent packings.

7. The vehicle electrocatalyzer according to claim 1, wherein:
said hollow outer shell is an elongate cylindrical tube; and
each of said anodic and cathodic electrocatalytic cell modules comprises a plurality of elongate tubular members, said nanoparticle coating being disposed on each of said plurality of elongate tubular members.

8. A vehicle electrocatalyzer for recycling carbon dioxide to fuel hydrocarbons, comprising:
a hollow outer shell;
a plurality of multistage anodic and cathodic electrocatalytic cell modules electrically connected and spaced at intervals, wherein adjacent cell modules have opposite polarities inside the hollow outer shell, each of the cell modules including a plurality of members having a nanoparticle coating, the nanoparticle coating being selected from the group consisting of metallic copper, iron, carbonaceous materials, metal oxides, and metal-supported catalysts;
gas manifolds having a gas-out conduit and a gas-in conduit attached to respective opposing ends of said hollow outer shell to allow carbon dioxide gas flow through the electrocatalyzer; and
gas permeable isolation membranes disposed between the electrocatalytic cell modules;
wherein, when the gas manifold is connected in a feedback loop to a vehicle exhaust system and the cells are subjected to voltage across the cells maintaining the opposing polarities of adjacent cell modules, carbon dioxide flowing through the electrocatalyzer is converted to selective hydrocarbon fuels based on the nanoparticle coating of each of the plurality of electrocatalytic cell modules, the hydrocarbon fuels being adapted for recycling to fuel a combustion engine of the vehicle.

9. The vehicle electrocatalyzer according to claim 8, further comprising a DC voltages source applying a direct current to the cell modules.

10. The vehicle electrocatalyzer according to claim 8, further comprising an AC voltage source applying an alternating current to the cell modules.

11. The vehicle electrocatalyzer according to claim 8, wherein each of said anodic and cathodic electrocatalytic cell modules includes an electrically semi-conductive catalyst packing inside said outer housing, the electrocatalyzer further comprising an isolator disposed between adjacent packings.

12. The vehicle electrocatalyzer for recycling $CO_2$ to fuel hydrocarbons according to claim 8, wherein each of said anodic and cathodic electrocatalytic cell modules includes an electrically conductive catalyst packing inside said outer housing, the electrocatalyzer further comprising an isolator disposed between adjacent packings.

13. The vehicle electrocatalyzer according to claim 8, wherein:
said hollow outer shell is an elongate cylindrical tube; and
each of said anodic and cathodic electrocatalytic cell modules comprises a plurality of elongate tubular members, said nanoparticle coating being disposed on each of said plurality of elongate tubular members.

* * * * *